R. N. EGGLESTON.
STAKE.
APPLICATION FILED MAY 29, 1914.
1,308,939.
Patented July 8, 1919.
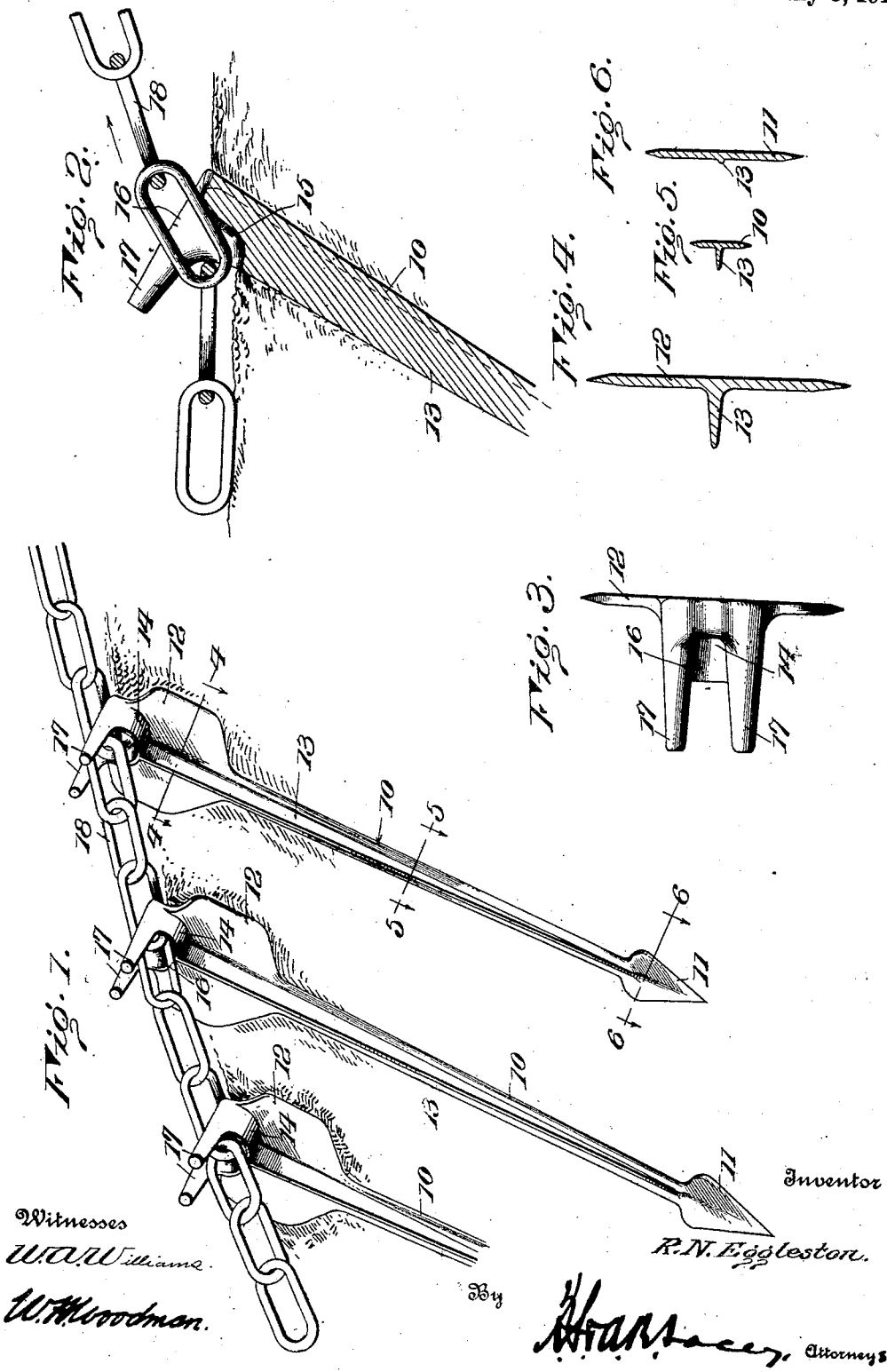
Witnesses
W. A. Williams
W. H. Woodman
Inventor
R. N. Eggleston.
By
Attorneys

UNITED STATES PATENT OFFICE.

ROBERT N. EGGLESTON, OF MUSKOGEE, OKLAHOMA, ASSIGNOR TO PULL-U-OUT MANUFACTURING COMPANY, OF ST. LOUIS, MISSOURI, A CORPORATION OF MISSOURI.

STAKE.

1,308,939.

Specification of Letters Patent.

Patented July 8, 1919.

Application filed May 29, 1914. Serial No. 841,899.

*To all whom it may concern:*

Be it known that I, ROBERT N. EGGLESTON, a citizen of the United States, residing at Muskogee, in the county of Muskogee and State of Oklahoma, have invented certain new and useful Improvements in Stakes, of which the following is a specification.

This invention relates to devices that are used for anchoring to the ground a chain, cable, block and tackle or other member that acts as a stay or guy which is adapted to be subjected to a pull or strain.

One object of my invention is to provide a ground stake or land anchor that can be easily inserted and withdrawn from the ground and which is so constructed that it can be made small and light-weight and still be efficient for securely anchoring a stay or other member that is subjected to great strains, thereby producing a ground stake that can be carried in a tool box or other small compartment of an automobile for use in extracting the machine from a ditch, mud hole or other obstruction.

Another object is to provide a ground stake or land anchor having the characteristics just described, which is so designed that a chain or a knotted rope can be easily connected to same or detached therefrom. Other objects and desirable features of my invention will be hereinafter pointed out.

Figure 1 of the drawings is a perspective view, illustrating a plurality of ground stakes constructed in accordance with my invention, arranged in operative position in the ground for anchoring a chain that is adapted to be subjected to excessive strains or pulls.

Fig. 2 is a vertical sectional view of a single ground stake embodying my invention, that is arranged in operative position in the ground for anchoring a chain.

Fig. 3 is a top plan view of my improved ground stake; and

Figs. 4, 5 and 6 are horizontal sectional views of said stake, taken on the lines 4—4, 5—5 and 6—6, respectively, of Fig. 1.

Referring to the drawings, which illustrate the preferred form of my improved stake and the method of using same, 10 designates the body portion or shank of the stake, which preferably consists of a relatively thin, flat web that is provided at its lower end with a piercing point 11 of arrow head shape or other suitable form that can penetrate the ground easily, the web of said piercing point lying in the same plane as the web of the shank and forming a continuation of same. At the upper end of the shank 10 is a head or ground-engaging portion 12 that consists of a relatively wide, flat web which lies in the same plane as the web of the shank 10 and forms a continuation of same, the side edges and lower end of the head 12 being tapered inwardly toward the shank 10, so as to enable the stake to be driven into the ground easily and also be withdrawn from the ground easily. The shank 10 can either be of the same width throughout its entire length, or it can be tapered slightly from its upper toward its lower end, and in the preferred form of my invention as herein shown, the edge portions of the webs of the shank, the piercing point and the head or ground-engaging portion of the stake are beveled slightly, as shown in Figs. 4, 5 and 6, so as to facilitate the insertion and removal of the stake. A rib 13 that is arranged at right angles to the webs of the shank 10 and the head 12 extends longitudinally of the stake, so as to reinforce and strengthen the stake, said rib 13 tapering downwardly from the upper toward the lower end of the stake so that the lower end of same fades away or merges into the piercing point 11, as shown in Fig. 1. In addition to acting as a reinforcement or strengthening device for the stake, the rib 13 also tends to prevent the stake from moving laterally or sidewise when it is positioned in the ground.

The stake is provided at its upper end with a portion to which the member that the stake anchors can be secured easily. In the preferred form of my invention, as herein shown, said securing portion or attaching portion consists of a bifurcated jaw formed by two spaced fingers or prongs 17 that project from the rear side of the stake at approximately right angles to the head or ground-engaging portion 12. Said prongs 17 are integrally connected to a boss 14 on the rear side of the head 12, and said boss is provided with a socket or opening 15 whose upper end is open and merges into the bifurcation or slot 16 between the prongs 17. The stake is formed of cast metal and all of the various elements or parts of same previously described, are integrally connected together, so as to produce a strong and rigid stake that can be manufactured cheaply. It is immaterial, so far as my broad idea is concerned, what particular kind of a securing means is used at the upper end of the stake for connecting the stake to the member which it is desired to anchor, but I prefer to provide the stake with a bifurcated member whose jaws or side portions project rearwardly from the stake at approximately right angles to the shank thereof, so as to enable a chain or a cable or rope provided with a knot to be attached to the stake easily, by simply arranging it across the upper end of the stake, with one link or knot therein positioned below the prongs 17. Such an attaching member also enables a chain or rope to be easily disconnected from the stake, by simply pulling it rearwardly out of the slot between the prongs 17. When the stake is used for anchoring a chain, one link of the chain is arranged vertically between the prongs 17, as shown in Fig. 2, the lower portion of said link entering the socket 15 in the boss 14, and thus causing the adjacent link of the chain to bear against the boss 14 at a point below the rearwardly projecting prongs 17, which prevent said link from moving upwardly when the chain is subjected to a pull or strain. The vertically-disposed link of the chain that is positioned between the prongs 17 bears upon the upper end of the stake in such a manner that it tends to force the stake downwardly farther into the ground when the chain is subjected to a pull.

Instead of arranging the stake in a vertical position or in an inclined position with its upper end pointing away from the direction of pull or from the direction in which the strain is applied to the stake, I arrange my improved stake in an inclined position, with its upper end pointing toward the direction that the pull or strain is exerted on the stake, as shown in Figs. 1 and 2. By arranging the stake in this manner I can use a small, light-weight stake to securely anchor a member that is adapted to be subjected to great strains. This is due, primarily, to the fact that the portion of the ground that resists the forward movement of the stake lies in front of the stake and under same, as shown in Fig. 2, instead of lying over the stake, as when a stake is arranged in the ordinary manner with its upper end inclined away from the direction in which the strain is applied. In other words, when the stake is arranged in the manner shown in Fig. 2, the pull or strain that is exerted on the stake causes the stake to compress the ground that lies in front and on the underside of same, and as this ground can be compressed only to a limited degree, owing to the fact that the pressure is applied downwardly, the stake cannot move enough to loosen the ground around same sufficiently to permit the stake to be pulled out. When the stake is inclined in the opposite direction there is only a relatively small amount of earth to resist the forward movement of the stake, namely, the earth lying between the front side of the stake and the surface of the ground. When the stake is subjected to an excessive pull it will exert upward pressure on this portion of the ground, and thus rip up the ground. The result is that a short stake set in an inclined position, with its upper end pointing away from the direction that the pull or strain is applied to the stake, will be moved forwardly through the ground when it is subjected to an excessive strain. Consequently, it will loosen the ground around same to such an extent that it will pull out if the strain is continued after the stake has assumed a forwardly inclined position. To state it in another way, a stake that is positioned in the ground in the manner shown in Fig. 2 will fulcrum on the ground at approximately the surface of the ground as soon as the stake is subjected to a forward pull, and as the pulling member is connected to the stake at approximately the fulcrum point of same, said pulling member cannot exert sufficient leverage on the stake to cause the ground lying underneath the front side of the stake to be compressed sufficiently to form a hole large enough to permit the stake to be pulled out, the portion of the ground that lies back of the stake and above same of course acting as a resistance to the upward swinging movement of the stake. With a stake that is inclined in the opposite direction the fulcrum point about which the stake turns is located at the lower end of the stake, and as the pulling member is connected to the stake at some distance above this fulcrum point, it exerts leverage on the stake in proportion to the length of the stake.

In using the stake it is desirable to arrange the chain or member 18 that is to be anchored as nearly parallel to the ground as possible, so as to reduce the tendency of said member to exert a direct upward pull on the stake, and in cases where it is impossible to arrange the stay member or pulling member 18 in this manner, I use a plurality of stakes, arranged one behind the other in tandem relation or in longitudinal alinement, and connect the member 18 to all of the stakes, as shown in Fig. 1. When a plurality of stakes are arranged in tandem relation and with their upper ends inclined toward the direction in which the strain is to be applied, as shown in Fig. 1, the portion of the member 18 that extends between the first and second stakes and between the second and third stakes lies absolutely parallel to the ground, and thus exerts a pull on said stakes in such a direction that there is little tendency for the second and third stakes to pull upwardly. When the member 18 is subjected to a pull the pull will be transmitted in a direction parallel to the ground directly to the second and third stakes, the second stake coming into operation after the portion of the chain that lies between same and the first stake has become taut, due to a slight forward movement of the first stake, and the third stake coming into operation after the portion of the chain that lies between same and the second stake has become taut, due to a slight forward movement of the second stake. A ground stake of the construction described is efficient, even though it is short and of light-weight; and it can be forced into the ground easily, due to the fact that the shank of same is of relatively small cross-sectional area and the head or ground-engaging portion 12 at the upper end of same is tapered slightly longitudinally of the stake. It can also be withdrawn from the ground easily for the same reasons. Therefore, a stake of this construction is particularly adapted for use as an automobile accessory because it can be made small and light enough to be carried conveniently in an automobile, it can be inserted and withdrawn quickly and easily and it is of such a design that it will hold securely in soft or loose earth. In practice I have found that a single stake of the construction above described and of approximately ten inches in length can be used successfully as an anchoring device for a block and tackle mechanism employed to pull an automobile out of a mud hole or ditch, but in cases where the ground is particularly soft and muddy, or in cases where the automobile being extracted is exceptionally heavy and deeply embedded in mud, I use a number of stakes arranged in tandem relation, as shown in Fig. 1, so as to eliminate the possibility of the first stake pulling out or becoming bent.

Having thus described my invention, what I claim, and desire to secure by Letters Patent, is:

1. A ground stake consisting of a body portion that comprises a flat web and a relatively wide, integral ground-engaging portion at the upper end of the stake that comprises a web which lies in the same plane as the web of said body portion and merges into same, the lower side edges of said ground-engaging portion slanting inwardly toward the body portion so that the stake can be easily inserted and removed from the ground.

2. A ground stake consisting of a body portion that comprises a flat web, a relatively wide, integral ground-engaging portion at the upper end of the stake that comprises a web which lies in the same plane as the web of said body portion and merges into same, the side edges of said ground-engaging portion being so shaped that the stake can be easily inserted and removed from the ground, and a reinforcing device extending longitudinally of the stake consisting of a flange that is arranged at approximately right angles to the web of said body portion and ground-engaging portion.

3. A ground stake consisting of a body portion that comprises a flat web and a relatively wide, integral ground-engaging portion at the upper end of the stake that comprises a web which lies in the same plane as the web of said body portion and merges into same, the lower side edges of said ground-engaging portion slanting inwardly toward the body portion so that the stake can be easily inserted and removed from the ground, a piercing point at the lower end of said stake comprising a web that lies in the same plane and merges into the web of said body portion, and a longitudinally tapered rib on one side of said stake arranged at right angles to the web of the body portion of same and having its lower end merging into the piercing point of the stake.

4. A ground stake consisting of a body portion that comprises a relatively flat web provided with a longitudinally extending reinforcing device consisting of a flange that projects from one side of same at approximately right angles to the web, a longitudinally tapered ground-engaging portion at the upper end of said web, and means at the upper end of the stake to which a member can be connected, said means consisting of a bifurcated member that is arranged at approximately right angles to said body portion and which is integrally connected to a recessed boss on said web to which the upper end of said reinforcing device is joined.

5. A ground anchor consisting of a body portion provided at its lower end with an integral piercing portion and at its upper end with an integral ground-engaging portion, all of said portions comprising relatively thin webs that lie in the same plane and whose longitudinal edges are inwardly inclined so that the stake can be easily inserted and withdrawn from the ground, an integral reinforcing and strengthening means on the web of said body portion, and an integral, bifurcated attaching member on said ground-engaging portion that is arranged at approximately right angles to the web of same.

6. A ground anchor consisting of a body portion provided at its lower end with an integral piercing portion and at its upper end with an integral ground-engaging portion, all of said portions comprising relatively thin webs that lie in the same plane and whose longitudinal edges are tapered so that the stake can be easily inserted and withdrawn from the ground, an integral reinforcing and strengthening means on the web of said body portion, an integral boss on one side of the web of the ground-engaging portion which is provided with a recess, and a pair of spaced prongs on said boss arranged in such a manner that the space between same merges into the recess in said boss.

7. A ground anchor consisting of a relatively thin, flat web provided at its upper end with a bifurcated portion that projects laterally from the rear side of the stake and having a reinforced flange that extends longitudinally of the web at approximately right angles to the face of the web and whose upper end is integrally connected to said bifurcated portion.

In testimony whereof I affix my signature in presence of two witnesses.

ROBERT N. EGGLESTON. [L. S.]

Witnesses:
J. K. MOORE,
SAMUEL N. ACKER.

Copies of this patent may be obtained for five cents each, by addressing the "Commissioner of Patents, Washington, D. C."